Figure 16:
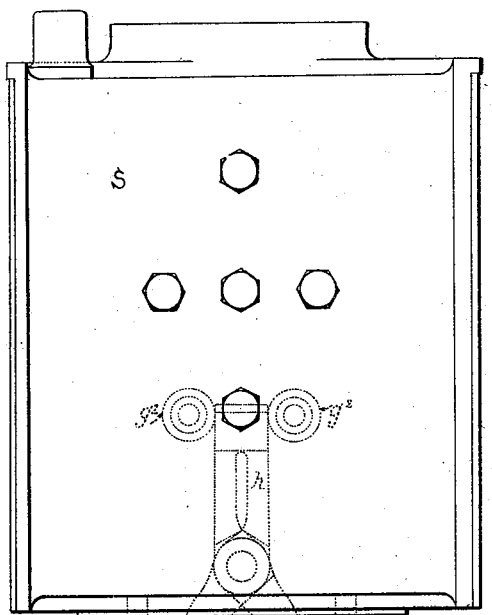

(No Model.) 9 Sheets—Sheet 1.
L. VIALET-CHABRAND.
LIFE SAVING FLOAT AND ITS DETACHING DEVICE.
No. 556,597. Patented Mar. 17, 1896.
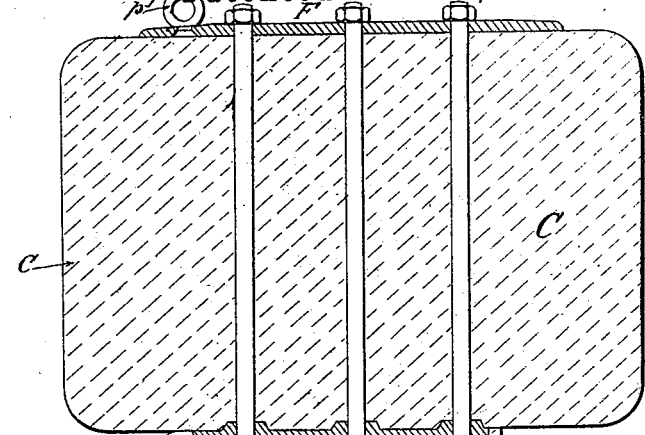
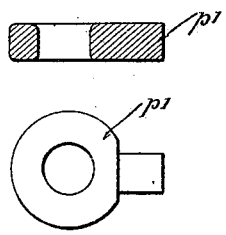
FIG. 2.
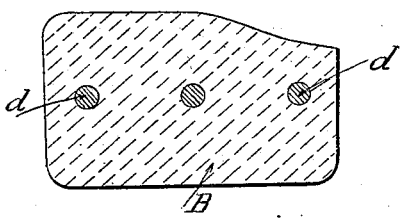
FIG. 3.
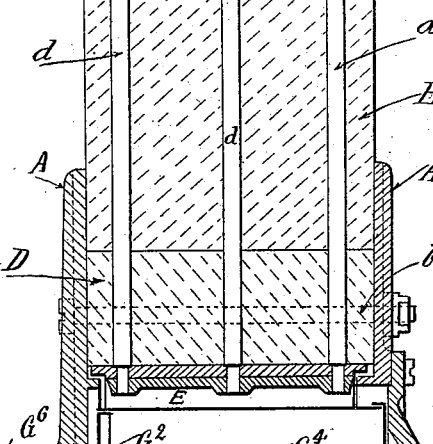
FIG. 1.
Witnesses:—
W. C. Pinckney
L. Holloway
Inventor:—
Lucien Vialet-Chabrand,
By J. E. M. Dowrey
Attorney.

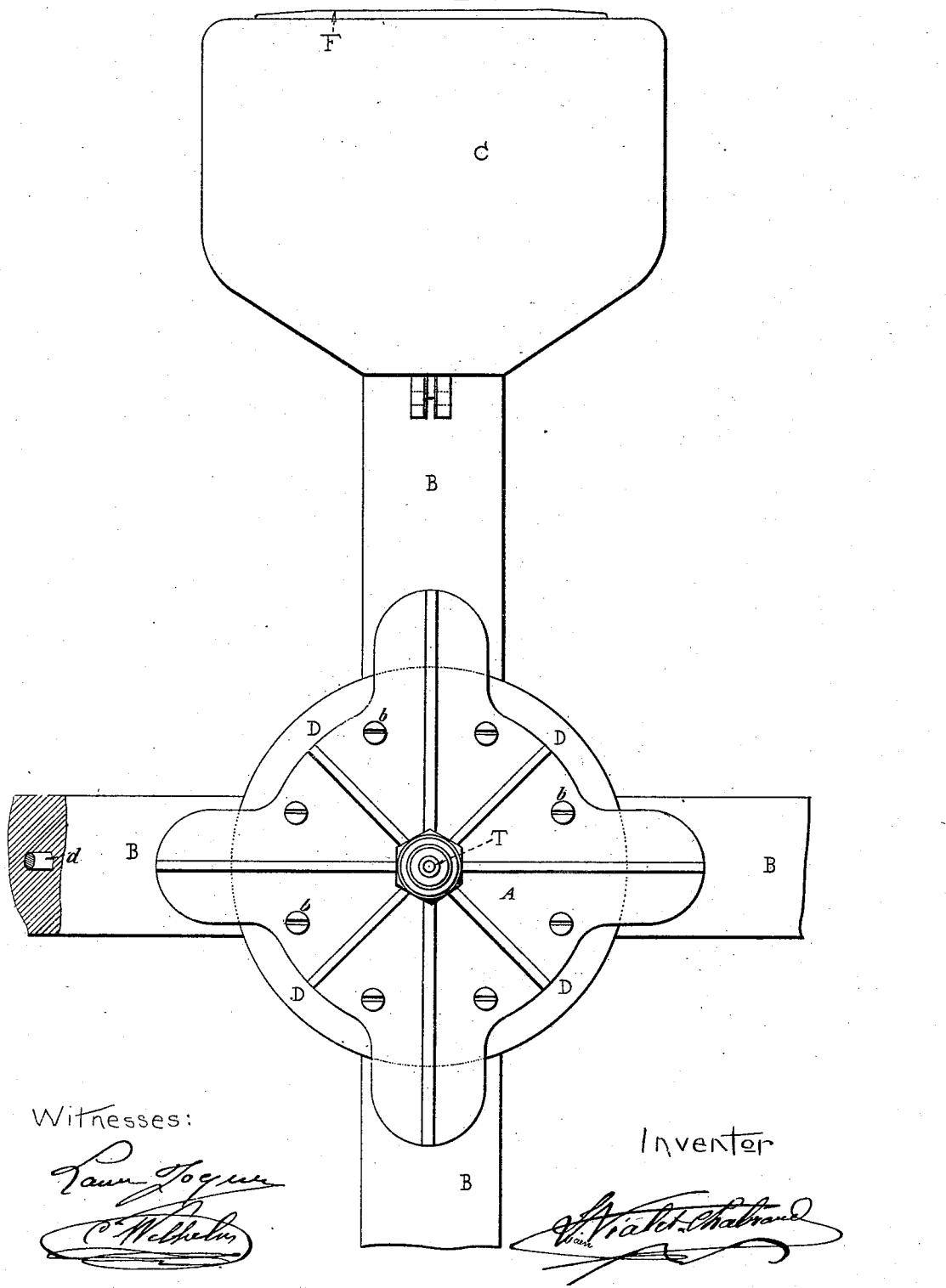

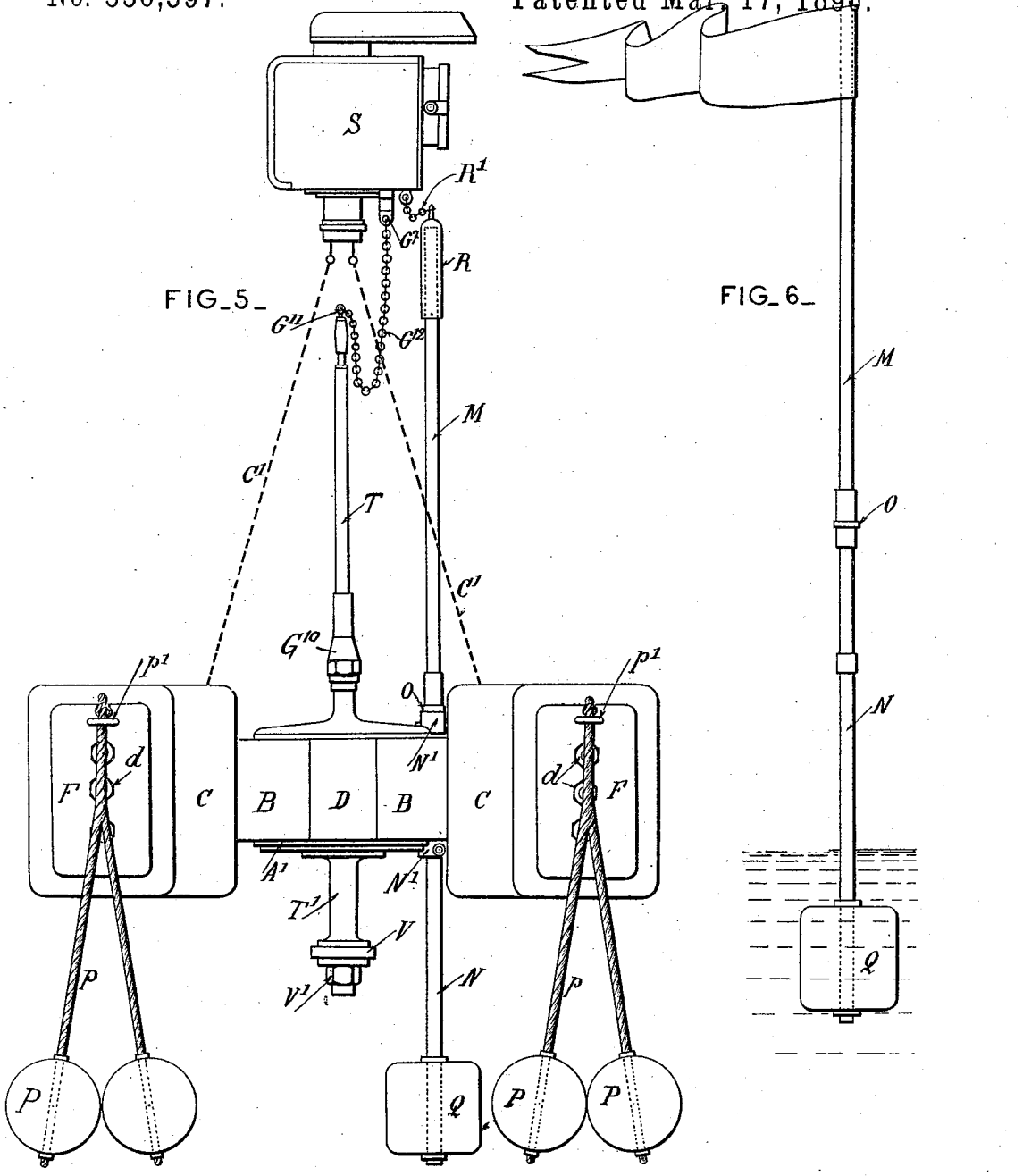

(No Model.) 9 Sheets—Sheet 4.
L. VIALET-CHABRAND.
LIFE SAVING FLOAT AND ITS DETACHING DEVICE.
No. 556,597. Patented Mar. 17, 1896.
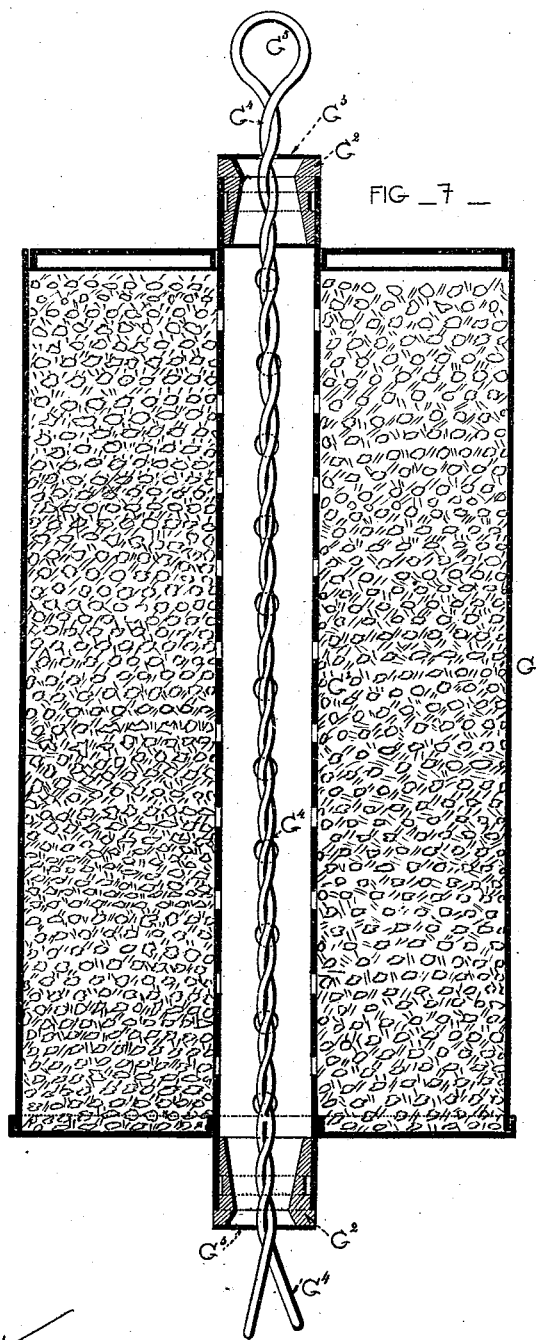
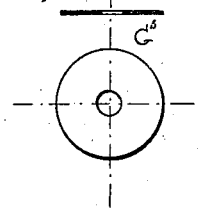
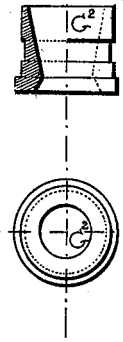
Witnesses:
Inventor:

(No Model.) 9 Sheets—Sheet 5.
L. VIALET-CHABRAND.
LIFE SAVING FLOAT AND ITS DETACHING DEVICE.
No. 556,597. Patented Mar. 17, 1896.
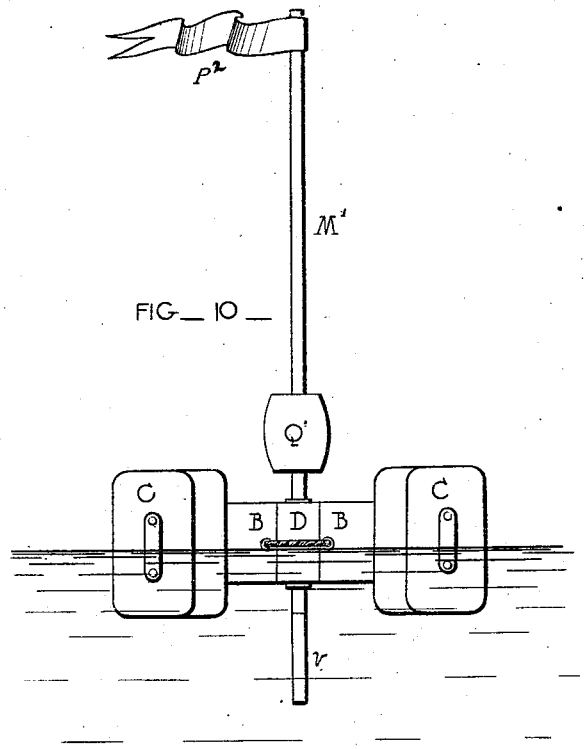
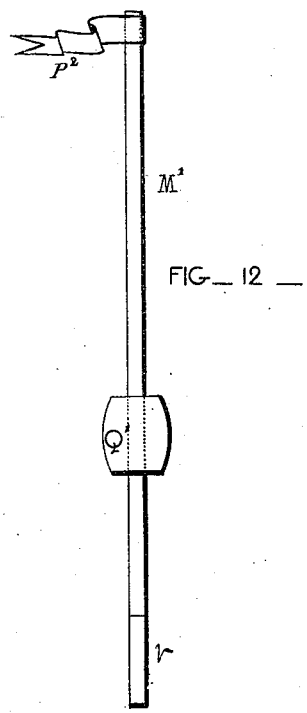
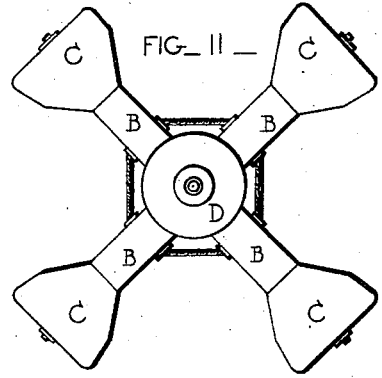
Witnesses
Inventor:

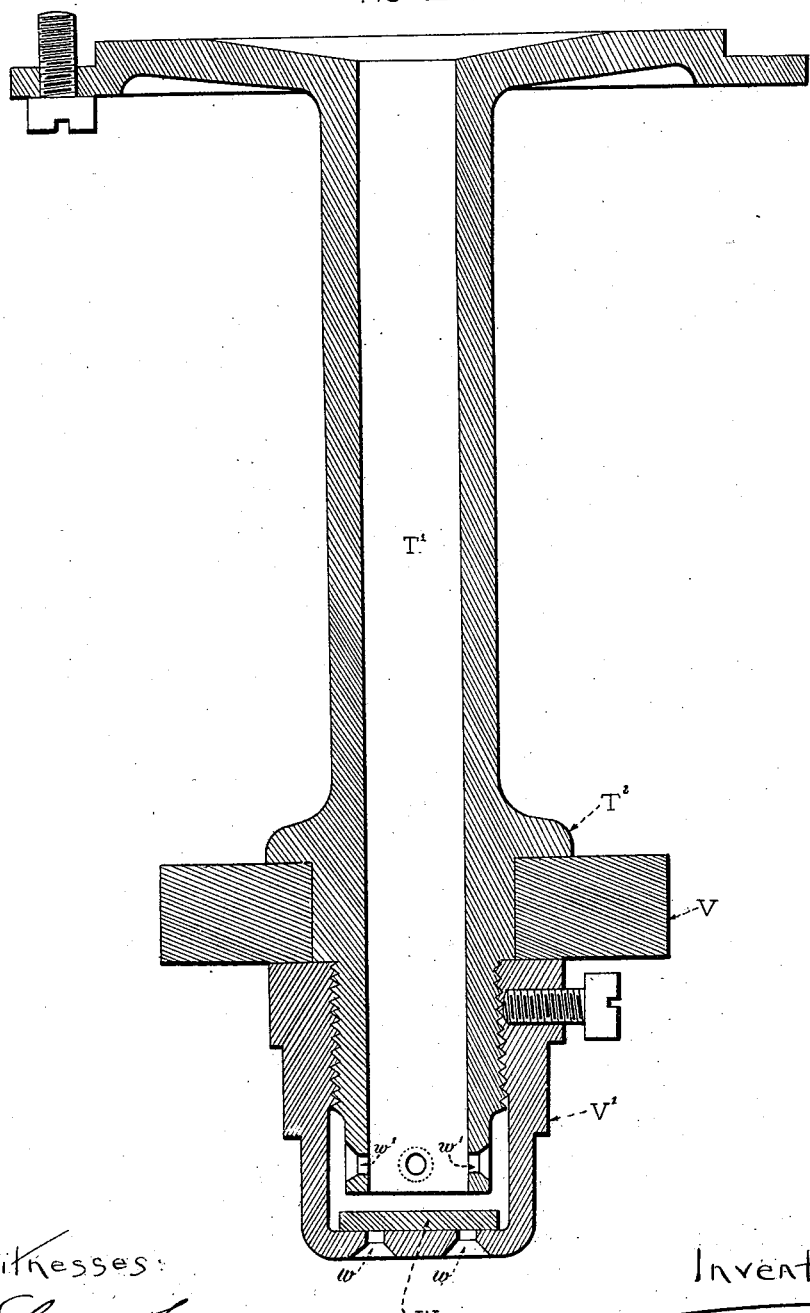

(No Model.) 9 Sheets—Sheet 7.
L. VIALET-CHABRAND.
LIFE SAVING FLOAT AND ITS DETACHING DEVICE.
No. 556,597. Patented Mar. 17, 1896.
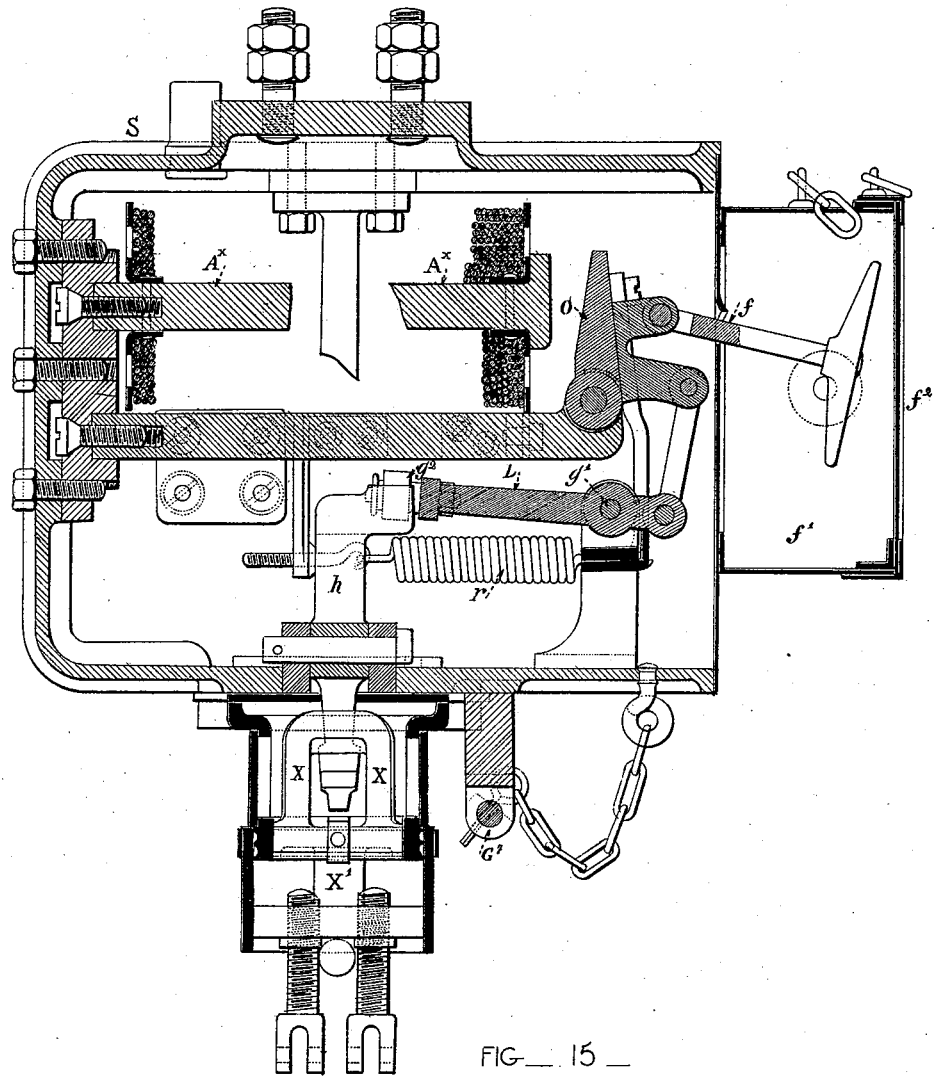
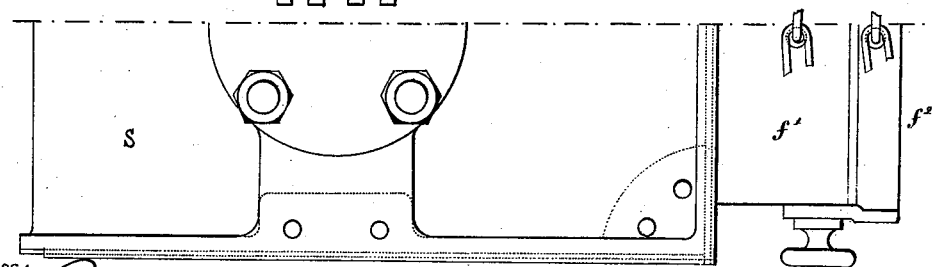
Witnesses: Inventor:

(No Model.)       9 Sheets—Sheet 8.
L. VIALET-CHABRAND.
LIFE SAVING FLOAT AND ITS DETACHING DEVICE.
No. 556,597. Patented Mar. 17, 1896.

Witnesses:

Inventor:

(No Model.) 9 Sheets—Sheet 9.

L. VIALET-CHABRAND.
LIFE SAVING FLOAT AND ITS DETACHING DEVICE.

No. 556,597. Patented Mar. 17, 1896.

Witnesses:

Inventer.

UNITED STATES PATENT OFFICE.

LUCIEN VIALET-CHABRAND, OF LA CIOTAT, FRANCE.

LIFE-SAVING FLOAT AND ITS DETACHING DEVICE.

SPECIFICATION forming part of Letters Patent No. 556,597, dated March 17, 1896.

Application filed July 19, 1893. Serial No. 480,872. (No model.) Patented in France October 31, 1889, No. 201,676, and April 21, 1890, No. 205,172, and in England January 10, 1890, No. 498, and June 2, 1890, No. 8,575.

*To all whom it may concern:*

Be it known that I, LUCIEN VIALET-CHABRAND, electrical engineer, of La Ciotat, Bouches-du-Rhône Department, France, have invented Improvements in Life-Saving Floats and their Detaching Devices, (for which I have obtained Letters Patent of France for fifteen years, No. 201,676, dated October 31, 1889, and No. 205,172, dated April 21, 1890, and of Great Britain, No. 498, dated January 10, 1890, and No. 8,575, dated June 2, 1890;) and I do hereby declare that the following is a full and exact description thereof, reference being made to the accompanying drawings.

My invention relates to floating apparatus for saving the lives of persons having accidentally fallen overboard or shipwrecked people that the ship may fall in with.

My invention has for its purpose to improve the construction of life-saving floats and of devices for rendering these floats, when they are in the water, visible to a shipwrecked man or men and to the crews of lifeboats.

It has also for its object devices for quickly mooring the said floats the instant they are wanted, the said devices, which are electrical ones, being capable of being operated from one or more determined points of the ship, as hereinafter fully explained.

The following conditions are necessary for the saving of a man fallen overboard: First, the life-saving apparatus must offer a point of support easy to get hold of and to keep without fatigue, and its disposition must be such that it can be immediately seen by the man overboard and the boat sent to save him; second, the said apparatus must be capable of being quickly moored and as near as possible to the man in the water—that is to say, at the stern of the ship—and by means of an apparatus operated at the point of the vessel where the outlook is always sharp, and whence indications of whatever nature are immediately transmitted—that is to say, the apparatus must be operated from the bridge.

The floats and their connected parts, which constitute my invention, fully fulfill the conditions hereinbefore mentioned, and in order that they may be well understood I will describe successively, first, the life-saving float and the devices by which it can be discovered on the water when at a distance; second, the devices for producing from the bridge the mooring of the float suspended from some part of the ship, and preferably from the stern.

Figure 17:
Figure 18:
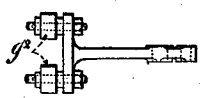
Figure 19:
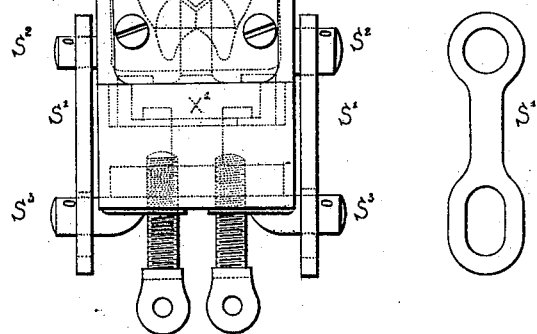
Figure 20:
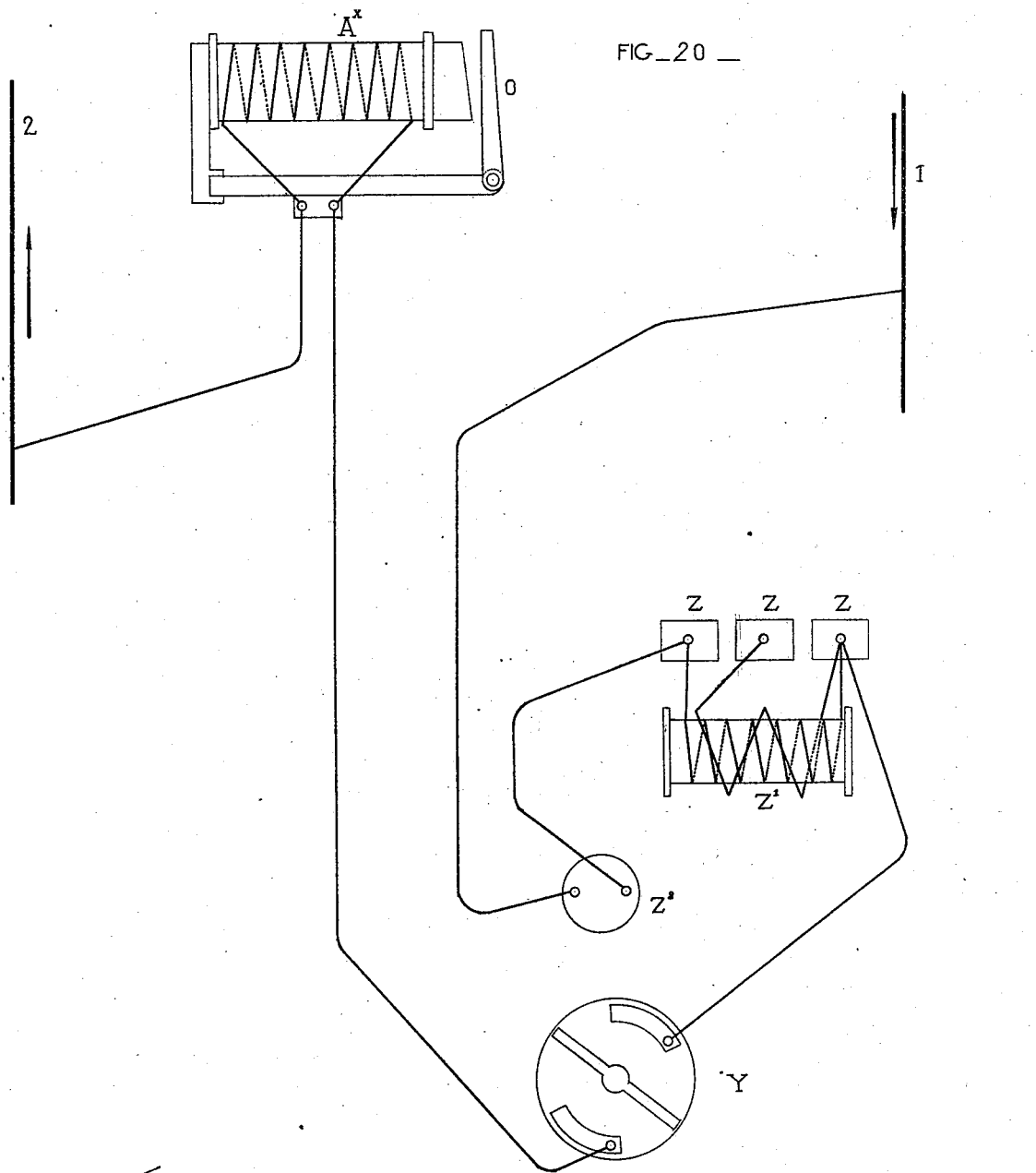

In the accompanying drawings, Figure 1 represents a part vertical section through the length of one of the arms of the float, which float is supposed to be provided with a fusee-box. Fig. 2 is a detail view of the ring to which is fixed a line or cable holding two cork loops serving as handles, and which may also serve to keep up a man overboard or shipwrecked. Fig. 3 is a cross-section of the arm of the float. Fig. 4 is a plan view corresponding to Fig. 1. Fig. 5 represents an elevation of the whole float provided with the signal-staff and suspended from the electrical apparatus allowing the float to be thrown into the sea from a distance—from the bridge, for instance. Fig. 6 represents a type of staff which can be fixed quite close to the center of the float when the latter carries a fusee-box. Fig. 7 is a vertical section of the fusee-box containing phosphuret of calcium. Fig. 8 is a detail view of the lead washer closing the central tube of the fusee-box. Fig. 9 is a detail view of a bronze ring for the central tube of the fusee-box. Fig. 10 represents an elevation of the float with four arms, which does not carry a fusee-box, provided with its signal-staff. Fig. 11 is a plan view of the float of Fig. 10. Fig. 12 is a separate view of the staff for float not carrying a fusee-box. Fig. 13 is a vertical section of a piece carrying the ballast of the float and fixed to it on the under side of its central part. Fig. 14 is a vertical section of the device to which the float is suspended on board ship; Fig. 15, a half-plan view of the suspending device of Fig. 14. Fig. 16 is an elevation of the farther side of the suspending or hanging device of Fig. 14. Figs. 17 and 18 are detail views of the lever L having rollers operating the opening and the closing of the scissors hook. Fig. 19 represents in detail a stop crank-arm. Fig. 20 is a diagrammatical representation of the electrical connections controlling the device.

By its construction the float entirely fulfills the following condition: For a man overboard to be able to maintain himself without fatigue on a float or wreckage and even when he is no longer conscious, it is absolutely necessary that he shall be held up by the armpits, that his arms can naturally fall down along his body in keeping hold of the piece which bears him up, and this support must be so disposed that it rests on the water at points which are distant from each other and between which the man overboard is placed in such a manner that the position he occupies is a perfectly stable one, and for that purpose he must be held up on the water by two bearing-surfaces placed on both sides and behind him and by a third one in front of him—that is to say, at three different points.

My life-saving float comprises a central body D, Figs. 1 and 4, from which project cork arms B, which end in large surfaces C, also made of cork, and which constitute the real supporting-points of the device. The central body D and the ends of the arms B are confined securely between two bronze cheeks A and A', connected together by means of bolts b b. The central crown D, arms B B, and enlarged parts C C are distinct pieces, firmly connected together, however, by bolts d d, disposed radially and screwed at the center of the apparatus in the blocks of an iron socket E. At the other end their nuts rest against an outside piece F, put on for that purpose, and which distributes the pressure of the piece C over a large surface. To each of the enlarged parts C are connected by rings p' and cables p, cork balls P, which are of a rather large diameter and coupled together in pairs, so as to serve not only as a means for getting hold of the float, but also for holding the man up in case he should not be able to get in between the arms of the float. For that purpose all he has to do is to pass his arms between the two branches of the cable connecting the cork balls together and then to let his arms fall, when the two parts of the cable come under his armpits and the balls, on account of their buoyancy, reappear on the surface behind him and on a level with his shoulders to hold him up, while in front the man is supported by the enlarged part to which the two balls are connected. This combination of coupled cork floating-points has for its object to prevent drowning men from being obliged to hold themselves up by clinging with their hands to the cables of the float and to allow the latter to give support not only to the four men who may be able to get between the arms of the same, but also to four other men, for whom there is room outside the enlarged parts.

In order that the floats may be seen immediately by the man overboard and the men in the boat sent to his rescue, those which are employed during the night carry a fusee-box, the two bottoms of which are pierced automatically when the float falls, so that a flame may show its position. Those which are employed during the day carry a staff and flag high enough to be seen from a long distance.

To make such float capable of being employed to advantage in day-time and make it visible for a long distance, a staff, which may always remain in its place, is added to it. The flag on this staff, by means of a peculiar arrangement, will reach its upper end and display itself in the day-time and reach a height which makes it immediately visible to the man overboard and the rescuing crew, while during the night this flag remains wound and held on the staff by a hood, which prevents it from being burned by the flame of the fusee-box, which then shows the position of the float.

The fusee-box comprises a cylindrical body G soldered to a central tube, G', pierced by numerous holes and carrying at its ends two rings $G^2$, to which are soldered two lead washers $G^3$, through which passes a spindle $G^4$ of copper wire tinned, also soldered to these washers in order to keep water-tight the box containing phosphuret of calcium. The spindle or rod $G^4$ ends at the top in a ring $G^5$, through which passes the horizontal portion of a hanger $G^6$. This hanger has an upper portion $G^8$ provided with shoulders which are adapted to engage with the shoulders of the interior contracted portion $G^9$ of a sleeve $G^{10}$. To the upper part of said hanger a cord or wire $G^{11}$ is attached, which passes through tube T, being secured where it leaves the same to a chain $G^{12}$ which is attached to point $G^7$ of the suspending apparatus. As the float falls into the water, chain $G^{12}$ is thereby put under tension, and said chain having some length in reserve lets the float fall; but when tension comes on the chain the rod $G^4$ is withdrawn with violence from the two washers $G^3$, which are torn by it, water enters the box from the bottom, and the phosphureted hydrogen escapes from the top and lights up into a flame at the end of a tube T, Fig. 1, which gives it a passage and which is of such a height that the flame cannot be of any inconvenience to the persons supported on the float. In this way the flame is visible a very long way off.

The staff for a float having a fusee-box, Figs. 5 and 6, is in two parts, the upper one, M, which carries a large flag being made of wood, the lower one, N, which must slide easily in the two collars N' N', which hold it in the float, is made of metal and has on its end a quantity of cork Q, the buoyancy of which is greater than that necessary for holding the staff entirely out of the water.

When the float is suspended underneath the electrical apparatus inclosed in a box S and used for dropping it when required, as hereinafter described, in the position which it normally occupies with reference to the float, the staff being provided with a small flange O, such flange will rest on the upper one of two collars N' N' provided on the float, the upper end of the staff being thereby held about eighty-five centimeters above the cheek A to which said collar N' is attached. When the float is on the water the buoyancy of the body of cork Q will cause the staff to slide upward through a tubular passage provided for it within the body of the float until such body of cork comes to rest against the lower collar, N', and it will be seen that by properly adjusting the distance between flange O and body Q the staff may be raised to any suitable elevation when the float strikes the water.

The flag is kept wound around the upper end of the staff and covered by a hood R secured by a chain R' underneath the suspending apparatus S in such a manner that the flag, together with the staff and the float, may be lowered while such hood remains suspended, the flag being unfurled as the float is being lowered. At night the chain should be detached from suspending apparatus S, so that the hood R may then remain fixed over the furled flag when the float is being lowered.

The described vertical upward movement of the staff has the effect of sending the flag up to about fifty centimeters above the nozzle at the end of tube T, which rises above the float—that is to say, to such a height that the flag can unfurl itself freely without any risk of its winding itself around the said tube and be immediately visible to the man overboard as well as to the crew coming to his rescue.

At its lower part, the float is provided with a tube T', Figs. 1, 5, and 13, which is in axial line with the fusee-box, and at the lower end of which is placed a lead washer V, which, being made of proper size, together with such tube and its metallic connecting parts, serves as ballast. This washer is held between the part $T^2$ of the tube and the base of a cup-nut V'. At the bottom of this cup rests a washer W, which operates as follows: When the float falls into the sea the pressure of the water makes itself felt through the openings $w$ $w$, raises the washer W, and the water enters by the holes $w'$ $w'$ into the tube T' and decomposes the phosphuret of calcium which is stored there. When the phosphuret of hydrogene escapes the pressure is such in the inside that the washer W falls back onto its seat and closes the openings $w$ $w$, so that then the escape of gas can only take place through the upper tube, T, of the float.

The staff M' for the float not having a fusee-box, Figs. 10, 11, and 12, is made of wood through its entire length and its disposition is such that it can be fixed at the center of the float or float by itself if thrown after the float, and near it, to show very nearly its position, a copper tube $v$, containing lead, serves as ballast and is placed at the lower end. At the upper end is fixed a narrow flag $p^2$, and toward the middle of its length is a quantity of cork Q' covered with linen, which holds the staff on the water when the said staff is not carried by the float.

Normally the flag is wound and held by a caoutchouc ring, which can be easily and readily taken off by means of a small handle at the moment the staff is thrown into the water.

For the purpose of being able to detach the float from its supports on board of a ship without being compelled to approach it closely, I use a detaching apparatus constructed as follows:

$h$ is a double hook made of bronze, its members extending above the hinge, joining them together and being provided with two upper horizontal extensions.

X is a yoke-piece suspended from the double hook, its upper cross-bar where it comes in contact with the hooks being made wedge-shaped. Such yoke is part of a metallic frame X', of which horizontal bolts $S^2$ and $S^3$ joined together by eye-bars S form parts, and from which extend downward four eye-bolts, to each of which is attached a rope connecting it to one of the arms of the float.

L is a bifurcated lever having at the end of each of its bifurcations a roller $g^2$. The two rollers $g^2$ $g^2$ are adjusted to be normally in contact with the two upper horizontal extensions on the double hook mentioned above, but so as to leave such extensions when the long arm of lever L is tilted downward sufficiently. When this occurs the wedge-shaped piece X, actuated by the weight of the float, will force apart the lower jaws of the double hook, and the float, together with the aforesaid frame and the connecting ropes, being originally suspended in a suitable position directly above the water, will drop into the water.

In order to cause rollers $g^2$ $g^2$ to so leave the horizontal extensions aforesaid, I suitably connect the lever L, which is fulcrumed at $g'$, with a swinging armature O of an electromagnet $A^\times$.

$r$ is a spiral spring holding armature O in a position corresponding with the locking position of the members of double hook $h$. (Indicated in Fig. 16.) When the electromagnet is energized, its armature O will be attracted and the lever L will thereby be actuated so as to cause the float to drop, as specified above.

If it be desired to release the float by hand instead of by means of an electric current, this may be accomplished by means of a rod $f$, with proper handle attached to the armature O, whereby the same may be moved mechanically instead of magnetically. $f'$ is a casing inclosing such handle and is provided with a glass front $f^2$.

As to electrically actuating the releasing device, this may be done in various ways. Thus, several independent circuits connected with the electromagnet of a life-saving float and having switches at different points on board of the ship may be employed, or a series of such floats may be controlled by a switch in a single circuit on the bridge of the ship.

Fig. 20 shows a diagram of the electrical connections in a circuit comprising only one switch on the bridge, and for the operation of which current is taken between two wires 1 2 connected with the terminals of the electrical machine. The current comes to wire 1 from the electrical machine. It goes away by wire 2 to the stern of the ship or returns to the electrical machine.

$A^\times$ is the electromagnet of the device for suspending the float.

Z Z are connecting-plates.

Z' is a resistance varying the voltage of the source of electricity.

$Z^2$ is the cut-out.

Y is the switch placed on the bridge.

I claim as new and desire to secure by Letters Patent—

1. In a life-saving float, the combination with a rigid central body, of lateral buoyant arms extending therefrom and widened at a distance from such central body, and means for maintaining said arms in their relative positions, substantially as set forth.

2. In a life-saving float the combination with a rigid central body, of lateral buoyant arms extending therefrom and made of an increased depth at a distance from such central body, and means for maintaining said arms in their relative positions, substantially as set forth.

3. In a life-saving float the combination with a central body of lateral buoyant arms extending therefrom and provided with outer projections extending above and underneath and to both sides of the main bodies of the arms, substantially as set forth.

4. In a life-saving float the combination with a central crown D, of arms B, and of the enlarged parts C at the ends of said arms, such arms and extensions being made of cork and joined together by radial bolts, substantially as set forth.

5. In a life-saving float, the combination with a float of proper construction, of a flag-staff connected therewith, such float having a passage through which such staff slides, and an auxiliary float for elevating such staff when the main float reaches the water, substantially as set forth.

6. In a life-saving float, the combination with a central casing of a fusee-box confined therein, arms made of cork extending radially from such casing, and bolts connected with such central casing and having their outer ends confined in contact with proper washers at the ends of such arms, substantially as set forth.

7. In a life-saving float, in combination with the float, a fusee-box containing a proper chemical, an adjoining chamber having a port for admitting water to it from below and having an upper port for the discharge of the ignited gases, suitable devices for closing said ports, and means for rupturing said closing devices when the float is detached from its supports, the partition between the fusee-box and the adjoining chamber being perforated, substantially as set forth.

8. In a life-saving float, the combination with the float, of a suspending-frame, a hook to which such frame is detachably secured, an electromagnet with suitable electrical connections having its armature mechanically connected with such hook, whereby upon energizing the electromagnet the suspending-frame will be released, substantially as set forth.

9. In a life-saving float, the combination with the float, of a suspending-frame, a hook to which such frame is detachably secured, an electromagnet with suitable electrical connections having its armature mechanically connected with such hook and a handle attached to said armature, substantially as set forth.

In witness whereof I have hereunto set my hand in presence of two witnesses.

LUCIEN VIALET-CHABRAND.

Witnesses:
PIERRE JACQUES,
C. WILHELM.